(12) United States Patent
Yamaji et al.

(10) Patent No.: US 9,870,507 B2
(45) Date of Patent: Jan. 16, 2018

(54) IMAGE EXTRACTION DEVICE, IMAGE EXTRACTION METHOD, PROGRAM, AND RECORDING MEDIUM

(71) Applicant: FUJIFILM Corporation, Tokyo (JP)

(72) Inventors: Kei Yamaji, Tokyo (JP); Junichi Asada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 20 days.

(21) Appl. No.: 15/135,654

(22) Filed: Apr. 22, 2016

(65) Prior Publication Data

US 2016/0371536 A1     Dec. 22, 2016

(30) Foreign Application Priority Data

Jun. 22, 2015 (JP) ................... 2015-124693

(51) Int. Cl.
  *G06K 9/00*    (2006.01)
  *G06F 17/30*   (2006.01)
(52) U.S. Cl.
  CPC ... *G06K 9/00677* (2013.01); *G06F 17/30247* (2013.01)
(58) Field of Classification Search
  None
  See application file for complete search history.

(56) References Cited

U.S. PATENT DOCUMENTS

| | | | | |
|---|---|---|---|---|
| 8,306,331 B2* | 11/2012 | Muramatsu | ............ | G06T 11/60 382/118 |
| 8,411,968 B2* | 4/2013 | Isomura | ............ | G06F 17/30265 382/100 |
| 8,929,669 B2* | 1/2015 | Yabu | ............ | G06F 17/30247 382/225 |
| 8,948,465 B2* | 2/2015 | Tiwari | ............ | G06K 9/00771 382/115 |
| 9,280,701 B2* | 3/2016 | Sandler | ............ | G06K 9/6267 |
| 9,361,511 B2* | 6/2016 | Fukazawa | ............ | G06K 9/00288 |
| 9,521,211 B2* | 12/2016 | Ogawa | ............ | H04L 67/306 |
| 9,554,744 B2* | 1/2017 | Garnavi | ............ | A61B 5/444 |
| 9,569,895 B2* | 2/2017 | Suzuki | ............ | G06T 19/006 |
| 2006/0140455 A1* | 6/2006 | Costache | ............ | G06F 17/30259 382/118 |

(Continued)

FOREIGN PATENT DOCUMENTS

JP  2006-079457 A  3/2006
JP  2006-079460 A  3/2006

(Continued)

*Primary Examiner* — Feng Niu
(74) *Attorney, Agent, or Firm* — Studebaker & Brackett PC (57) ABSTRACT

In the image extraction device, an instruction acquisition unit acquires an instruction input by a user, and an image group selection unit selects a second image group, which has a smaller number of images than a first image group, from the first image group in response to the instruction. Then, an extraction reference determination unit determines an image extraction reference when extracting an image from the second image group based on images included in the first image group, and an image extraction unit extracts one or more images, the number of which is smaller than the number of images in the second image group, from the second image group according to the image extraction reference.

23 Claims, 5 Drawing Sheets

(56) References Cited

U.S. PATENT DOCUMENTS

| | | | | |
|---|---|---|---|---|
| 2006/0279555 | A1* | 12/2006 | Ono | G06F 17/30247 345/173 |
| 2008/0075338 | A1* | 3/2008 | Muramatsu | G06T 11/60 382/118 |
| 2009/0102940 | A1* | 4/2009 | Uchida | G06K 9/00664 348/222.1 |
| 2009/0116752 | A1* | 5/2009 | Isomura | G06F 17/30265 382/217 |
| 2010/0179874 | A1* | 7/2010 | Higgins | G06K 9/00664 705/14.53 |
| 2012/0148165 | A1* | 6/2012 | Yabu | G06F 17/30247 382/225 |
| 2013/0094721 | A1* | 4/2013 | Kawasaki | G06F 17/30265 382/118 |
| 2013/0266193 | A1* | 10/2013 | Tiwari | G06K 9/00771 382/115 |
| 2013/0335611 | A1* | 12/2013 | Roman | G06F 17/30247 348/333.01 |
| 2014/0205158 | A1* | 7/2014 | Fukazawa | G06K 9/00288 382/118 |
| 2014/0300635 | A1* | 10/2014 | Suzuki | G06T 19/006 345/633 |
| 2015/0110407 | A1* | 4/2015 | Sinha | G06K 9/6267 382/225 |
| 2015/0154775 | A1* | 6/2015 | Tobita | G06F 17/30247 345/619 |
| 2015/0178920 | A1* | 6/2015 | Garnavi | A61B 5/444 600/476 |
| 2015/0324630 | A1* | 11/2015 | Sandler | G06K 9/6267 382/118 |
| 2016/0004695 | A1* | 1/2016 | Yang | G06F 17/30247 707/738 |
| 2016/0171284 | A1* | 6/2016 | Sandler | G06K 9/6267 382/118 |
| 2016/0179846 | A1* | 6/2016 | Tobita | G06K 9/6218 382/305 |
| 2017/0035349 | A1* | 2/2017 | Garnavi | A61B 5/444 |

FOREIGN PATENT DOCUMENTS

| | | |
|---|---|---|
| JP | 2006-081021 A | 3/2006 |
| JP | 2006-236216 A | 9/2006 |
| JP | 2014-174787 A | 9/2014 |

* cited by examiner

IMAGE EXTRACTION DEVICE, IMAGE EXTRACTION METHOD, PROGRAM, AND RECORDING MEDIUM

CROSS-REFERENCE TO RELATED APPLICATIONS

The present application claims priority under 35 U.S.C. §119 to Japanese Patent Application No. 2015-124693, filed Jun. 22, 2015, all of which are hereby expressly incorporated by reference into the present application.

BACKGROUND OF THE INVENTION

1. Field of the Invention

The present invention relates to an image extraction device, an image extraction method, a program, and a recording medium for automatically extracting an image with a high degree of importance for a user from an image group.

2. Description of the Related Art

As analyses of image content, techniques, such as face detection/expression detection, person recognition, scene detection (night scene, evening scene, sea, nature (green), and the like), and object detection (pets, food, flowers, train, car, and the like), are generally used. In addition, a technique of determining the relationship between persons based on the number of appearances of a person in an image group, the number of persons imaged in the same image, and a distance between the faces of persons is already known. As disclosed in JP2006-236216A, JP2006-79460A, JP2006-81021A, JP4490214B, and JP2014-174787A, an image with a high degree of importance for a user is automatically extracted from an image group using such techniques.

JP2006-236216A discloses a technique of recognizing a plurality of persons in a plurality of images, calculating a degree of intimacy between persons based on the recognition results, and determining that persons recognized as different persons are the same person in a case where the difference in the degree of intimacy between persons recognized as different persons is equal to or less than a reference value.

JP2006-79460A discloses a technique of recognizing a plurality of persons in a plurality of images, calculating a degree of intimacy between persons in the plurality of images based on the recognition results, and selecting an image, which includes a person having a degree of intimacy with a viewer equal to or greater than a reference value set in advance, from the plurality of images.

JP2006-81021A and JP4490214B disclose a technique of recognizing a plurality of persons in a plurality of images, calculating a degree of intimacy in an image, which is the degree of intimacy between persons in each image, based on the recognition results, calculating a degree of intimacy in an album, which is the degree of intimacy between persons in a plurality of images, based on the degree of intimacy in an image, and selecting an image, which includes a person having a degree of intimacy in an album with a viewer that is included in a range set in advance, from the plurality of images.

JP2014-174787A discloses a technique of extracting a face image from a number of images, dragging and dropping a face image of an important person into an important region, and dragging and dropping a face image of a person, who does not need to be included in an electronic album, into an exclusion region.

SUMMARY OF THE INVENTION

The relationship between persons in an image group changes with a higher-level image group (population) in which the image group is included. The following cases (1) and (2) will be described as examples.

(1) In the case of an image group of one year of a family, images mainly include family members (children and parents). In particular, there are many images of children. Accordingly, it can be estimated that images with a strong relationship with children are important.

(2) In the case of an image group of a relative's wedding included in (1), images mainly include a bride and groom. Accordingly, it can be estimated that images with a strong relationship with the bride and groom are important.

In a case where only each image group of (1) and (2) is taken into consideration, important images can be estimated from images included in each image group as described above based on the features of the images included in each image group.

However, if it is known that the image group of the relative's wedding of (2) is one of the image groups of one year of the family of (1), it can be estimated that, also in the image group of the relative's wedding of (2), images including family members appearing frequently in the image group of one year of the family of (1), which is an image group of a higher level than the image group of the relative's wedding of (2), are important. Therefore, even in a case where the number of appearances of the family members in the image group of the wedding of (2) is small, it is possible to preferentially extract images of the family members from the wedding image group of (2).

In order to solve the problems in the related art, it is an object of the invention to provide an image extraction device, an image extraction method, a program, and a recording medium capable of accurately extracting an image with a high degree of importance for a user from an image group.

In order to achieve the aforementioned object, according to an aspect of the invention, there is provided an image extraction device comprising: an instruction acquisition unit that acquires an instruction input by a user; an image group selection unit that selects a second image group, which has a smaller number of images than a first image group, from the first image group in response to the instruction; an extraction reference determination unit that determines an image extraction reference when extracting an image from the second image group based on images included in the first image group; and an image extraction unit that extracts one or more images, the number of which is smaller than the number of images in the second image group, from the second image group according to the image extraction reference.

Here, it is preferable to further comprise an image analysis unit that analyzes images included in the first image group and calculates a relationship between persons present in the images included in the first image group based on the analysis result, and it is preferable that the extraction reference determination unit determines the image extraction reference according to the relationship between persons.

Preferably, the image analysis unit further calculates a relationship between persons present in images included in the second image group based on an analysis result of the images included in the second image group, and the extraction reference determination unit further determines the image extraction reference according to the relationship between persons present in the images included in the second image group.

Preferably, the extraction reference determination unit determines the image extraction reference by giving priority to the relationship between persons present in the images included in the second image group over the relationship between persons present in the images included in the first image group.

Preferably, the image analysis unit comprises: an image information acquisition section that acquires image information regarding images included in the first image group; an image feature analysis section that analyzes features of the images included in the first image group based on the image information; and a relationship calculation section that calculates a relationship between persons present in the images included in the first image group based on the image information and the image features.

Preferably, the relationship calculation section determines a degree of importance of each person from the relationship between persons, and the extraction reference determination unit determines the image extraction reference according to the degree of importance of each person.

Preferably, the relationship calculation section determines one or more persons whose number of times of appearance is equal to or greater than a threshold value in the first image group, among persons present in the images included in the first image group, as main persons, and determines one or more persons who are present in the images included in the first image group and whose distances from the main persons are equal to or less than a threshold value, among persons other than the main persons who are present in the images included in the first image group, as important persons, and the extraction reference determination unit determines the image extraction reference according to the main persons and the important persons.

Preferably, the relationship calculation section determines one or more persons whose number of times present in a center position of each image included in the first image group is equal to or greater than a threshold value, among persons appearing a number of times is equal to or greater than a threshold value in the first image group, as the main persons.

Preferably, the relationship calculation section determines one or more persons whose number of times present toward a front direction in each image included in the first image group is equal to or greater than a threshold value, among persons appearing a number of times is equal to or greater than a threshold value in the first image group, as the main persons.

Preferably, the relationship calculation section determines one or more persons whose number of times present with a face size equal to or greater than a threshold value in each image included in the first image group is equal to or greater than a threshold value, among persons appearing a number of times is equal to or greater than a threshold value in the first image group, as the main persons.

Preferably, the relationship calculation section further determines two or more persons other than the main persons, who are present in a center position of each image included in the first image group, as important persons.

Preferably, the relationship calculation section further determines two or more persons other than the main persons, who are present toward a front direction in each image included in the first image group, as important persons.

Preferably, the relationship calculation section further determines two or more persons other than the main persons, who are present with a face size equal to or greater than a threshold value in each image included in the first image group, as important persons.

Preferably, the relationship calculation section further calculates a relationship between a person present in each image included in the first image group and an object other than the person, and the extraction reference determination unit further determines the image extraction reference according to the relationship between the person and the object present in each image included in the first image group.

Preferably, the relationship calculation section determines a degree of importance of the object from the relationship between the person and the object, and the extraction reference determination unit determines the image extraction reference according to the degree of importance of the object.

Preferably, the relationship calculation section determines a scene that has been imaged a number of times equal to or greater than a threshold value, among scenes of images included in the first image group, as an important scene, and determines a person and an object, which are present in the images included in the first image group and whose relationship with the important scene is equal to or greater than a threshold value, as an important person and an important object, and the extraction reference determination unit determines the image extraction reference according to the main person, the important person, and the important object.

Preferably, the relationship calculation section determines an imaging date on which imaging has been performed a number of times equal to or greater than a threshold value, among imaging dates of images included in the first image group, as an important imaging date, and determines a person, an object, and a scene which are present in the images included in the first image group and whose relationship with the important imaging date is equal to or greater than a threshold value, as an important person, an important object, and an important scene, and the extraction reference determination unit determines the image extraction reference according to the main person, the important person, the important object, and the important scene.

In addition, it is preferable that the imaging date is an imaging time range, an imaging date, an imaging month, or an imaging season.

Preferably, the relationship calculation section determines an imaging location that has been imaged a number of times equal to or greater than a threshold value, among imaging locations of images included in the first image group, as an important imaging location, and determines a person, an object, and a scene which are present in the images included in the first image group and whose relationship with the important imaging location is equal to or greater than a threshold value, as an important person, an important object, and an important scene, and the extraction reference determination unit determines the image extraction reference according to the main person, the important person, the important object, and the important scene.

In addition, it is preferable to further include an image group determination unit that determines an image group to be analyzed by the image analysis unit from the first image group.

Preferably, the instruction acquisition unit acquires an instruction to select the second image group imaged on an imaging date within a predetermined range input by the user from the first image group classified according to imaging dates.

Preferably, the instruction acquisition unit acquires an instruction to select the second image group imaged on an imaging location within a predetermined range input by the user from the first image group classified according to imaging locations.

Preferably, the instruction acquisition unit acquires an instruction to select the second image group, which is included in a folder within a predetermined range input by the user, from the first image group classified according to folders.

In addition, according to another aspect of the invention, there is provided an image extraction method comprising: a step in which an instruction acquisition unit acquires an instruction input by a user; a step in which an image group selection unit selects a second image group, which has a smaller number of images than a first image group, from the first image group in response to the instruction; a step in which an extraction reference determination unit determines an image extraction reference when extracting an image from the second image group based on images included in the first image group; and a step in which an image extraction unit extracts one or more images, the number of which is smaller than the number of images in the second image group, from the second image group according to the image extraction reference.

Here, it is preferable to further comprise a step in which an image analysis unit analyzes images included in the first image group and calculates a relationship between persons present in the images included in the first image group based on the analysis result is further included, and it is preferable that the extraction reference determination unit determines the image extraction reference according to the relationship between persons.

Preferably, the step in which the image analysis unit calculates the relationship between persons includes: a step in which an image information acquisition section acquires image information regarding images included in the first image group; a step in which an image feature analysis section analyzes features of the images included in the first image group based on the image information; and a step in which a relationship calculation section calculates a relationship between persons present in the images included in the first image group based on the image information and the image features.

Preferably, the relationship calculation section further calculates a relationship between a person present in each image included in the first image group and an object other than the person, and the extraction reference determination unit further determines the image extraction reference according to the relationship between the person and the object present in each image included in the first image group.

In addition, according to still another aspect of the invention, there is provided a program causing a computer to execute each step of the image extraction method described above.

In addition, according to still another aspect of the invention, there is provided a non-transitory computer-readable recording medium in which a program causing a computer to execute each step of the image extraction method described above is recorded.

In the invention, the image extraction reference is determined based on the images included in the first image group of a higher level than the second image group, and images are extracted from the second image group based on the image extraction reference. Thus, by determining the image extraction reference based on the images included in the first image group of a higher level than the second image group, an image with a high degree of importance for the user can be accurately extracted from the second image group.

DESCRIPTION OF THE PREFERRED EMBODIMENTS

Hereinafter, an image extraction device, an image extraction method, a program, and a non-transitory recording medium of the invention will be described in detail based on a preferred embodiment shown in the accompanying diagrams.

Figure 1:
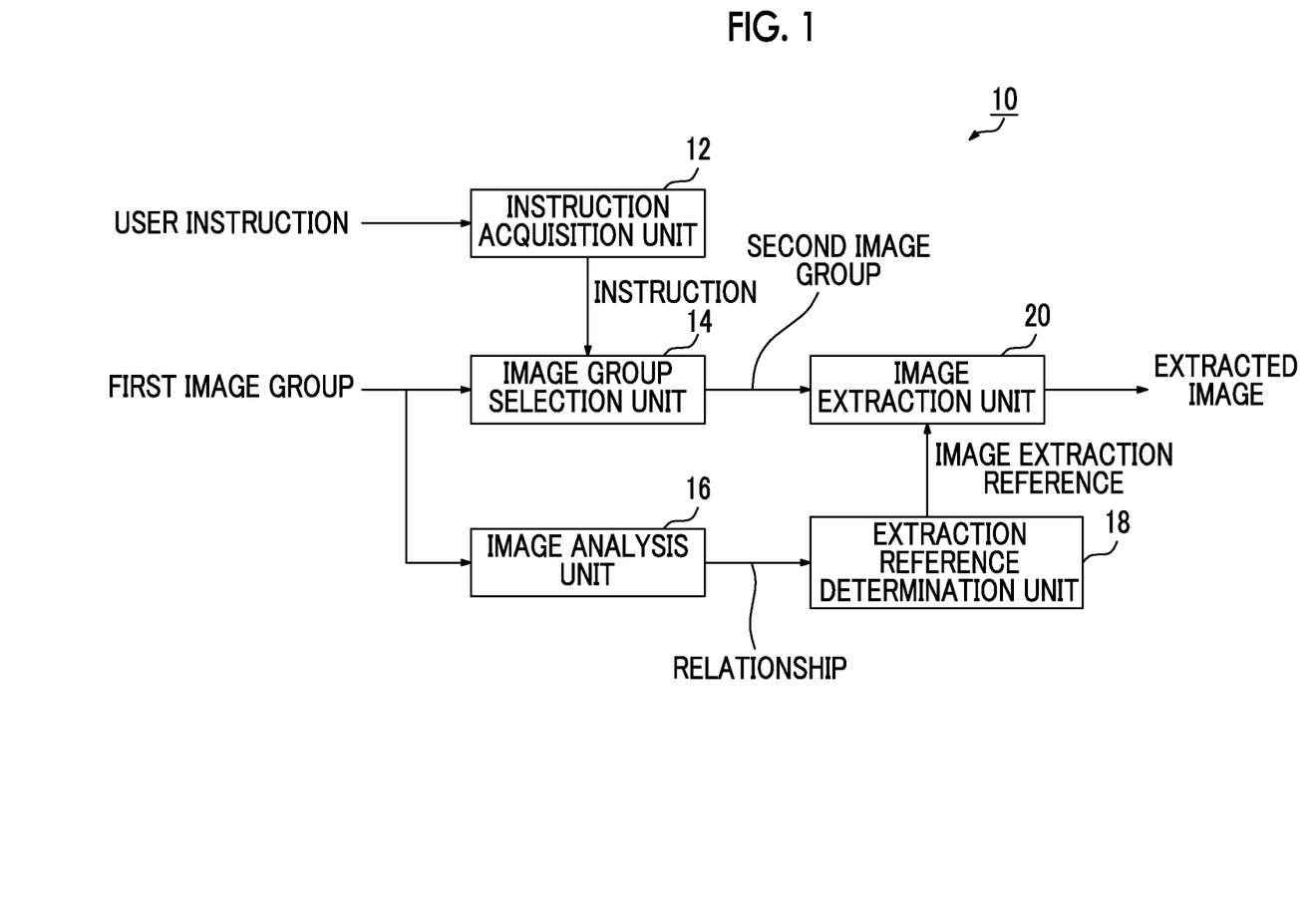
FIG. 1 is a block diagram of an embodiment showing the configuration of an image extraction device of the invention.

FIG. 1 is a block diagram of an embodiment showing the configuration of an image extraction device of the invention. An image extraction device 10 shown in FIG. 1 automatically extracts an image with a high degree of importance for a user from an image group.

The image extraction device 10 includes controlling device such as CPU. The CPU operates as an instruction acquisition unit 12, an image group selection unit 14, an image analysis unit 16, an extraction reference determination unit 18, and an image extraction unit 20.

The instruction acquisition unit 12 acquires various instructions input by the user, for example, an instruction (instruction of the user) to select a second image group imaged on an imaging date within a predetermined range from a first image group that is hierarchically classified according to imaging dates, such as year, season, month, day, and time range. Instruction by the user is input by user's operation of a mouse or touch panel included in the image extraction device 10.

Then, the image group selection unit 14 selects a second image group, which has a smaller number of images than the first image group, from the first image group in response to the instruction of the user acquired by the instruction acquisition unit 12.

Here, the first image group is an image group (population) of a higher level than the second image group. That is, the second image group is an image group of the lower level than the first image group. Image groups are classified by imaging dates. For example, in a case where the first image group is an image group of 2014, the second image group is an image group of February, 2014, or an image group of Feb. 3, 2014, or an image group of the morning on Feb. 3, 2014, which is an image group of the lower level than the image group of 2014. In addition, the relationship between the first and second image groups is relative. For example, in a case where the first image group is an image group of February, 2014, the second image group is an image group of Feb. 3, 2014, or an image group of the morning on Feb. 3, 2014, which is an image group of the lower level than the image group of February, 2014.

Then, the image analysis unit 16 analyzes images included in the first image group, and calculates the relationship between persons present in the images included in the first image group based on the analysis result. Similarly, the image analysis unit 16 calculates the relationship between persons present in images included in the second image group based on the analysis result of the images included in the second image group.

Here, face detection/expression detection, person recognition, scene detection (night scene, evening scene, sea, nature (green), and the like), object detection (pets, food, flowers, train, car, and the like), and the like are included in the image analysis. In addition, the relationship between persons indicates a relationship between a certain person and another person present in images included in an image group. For example, among persons present in the images included in the first image group, a person having a strong relationship with a main person with the highest degree of importance is a highly important person for the main person. Therefore, the person having a strong relationship with the main person is an important person next to the main person.

Figure 2:
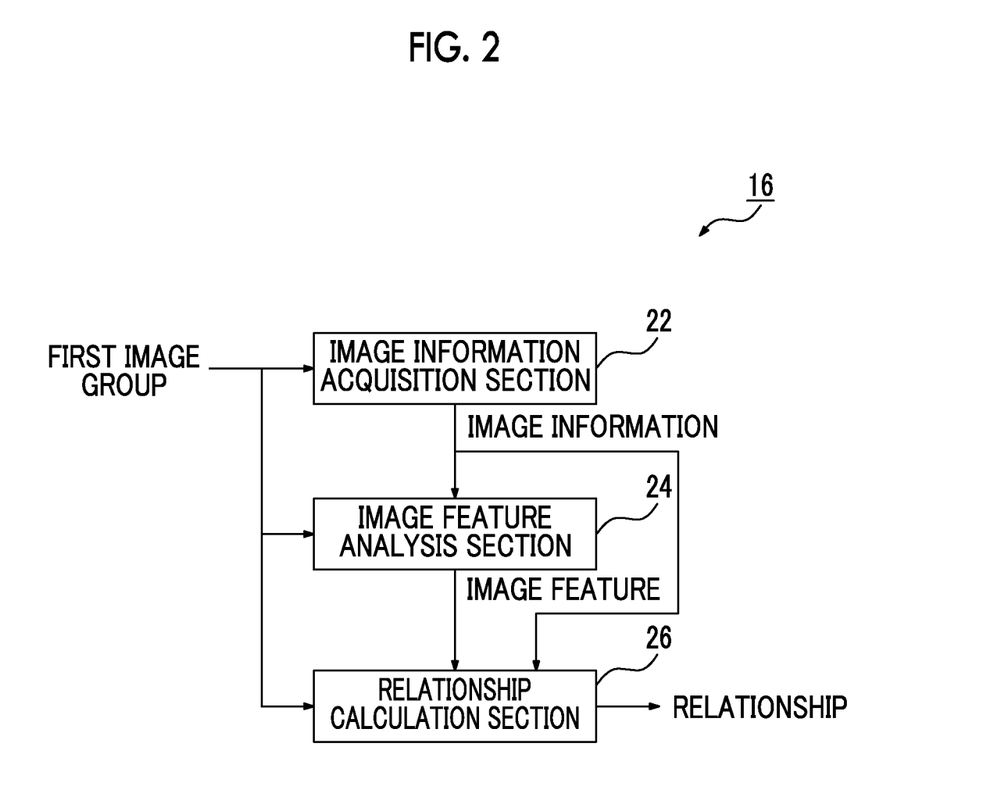
FIG. 2 is a block diagram of an embodiment showing the configuration of an image analysis unit shown in FIG. 1.

As shown in FIG. 2, the image analysis unit 16 includes an image information acquisition section 22, an image feature analysis section 24, and a relationship calculation section 26.

The image information acquisition section 22 acquires image information regarding the images included in the first image group.

Here, the image information includes information of imaging dates, scenes (outdoor, mountain, sea, night scene, and the like), imaging locations (global positioning system (GPS) information), subjects (persons and objects other than persons), and the like. The information of imaging dates and imaging locations can be acquired from exchangeable image file format (Exif) information that is accessory information of an image, for example. In addition, the information of scenes, persons, and objects can be acquired by image analysis, such as scene determination, person recognition, and object recognition.

The image feature analysis section 24 analyzes the features of images included in the first image group based on the image information acquired by the image information acquisition section 22.

In this case, a case is also included in which the image extraction unit 20 preferentially extracts an image, which is a sea scene and in which person A is present. That is, an image which is a sea scene and in which person A is present is extracted, but the extraction of other images is not excluded.

In addition, a case is also included in which the image extraction unit 20 specifies an image, which is a sea scene and in which person A is present, and extracts only a part of the image. That is, for example, evaluation values of images are calculated based on the image analysis result of the image analysis unit 16 for persons present in the images, and faces/expressions of the person, scenes, objects, and the like, a predetermined number of images with high evaluation of sea likeness are extracted in order, or a predetermined number of images with high evaluation of the likelihood of person A are extracted in order, or a predetermined number of images with high evaluation of the facial expression of person A are extracted in order, or a predetermined number of images having a high overall point of these evaluation values (also including a case of weighting) are extracted in order.

Here, the image features include features of the imaging content (scene, the number of appearances of a person or an object, and the like), imaging dates (imaging period of the first image group, an imaging frequency, and the like), an imaging location (the number of times of imaging in each imaging location and the like), and the like.

The relationship calculation section 26 calculates the relationship between persons, who are present in the images included in the first image group, based on the image information acquired by the image information acquisition section 22 and the image features analyzed by the image feature analysis section 24. In addition, based on the image information and the image features, the relationship calculation section 26 calculates the relationship between persons present in the images included in the second image group.

Then, based on the images included in the first image group, the extraction reference determination unit 18 determines an image extraction reference when extracting an image from the second image group.

In the case of the present embodiment, the extraction reference determination unit 18 determines the image extraction reference according to the relationship between the persons present in the images included in the first image group and the relationship between the persons present in the images included in the second image group, which have been calculated by the image analysis unit 16.

Finally, the image extraction unit 20 extracts one or more images (extracted image), the number of which is smaller than the number of images in the second image group, from the second image group according to the image extraction reference determined by the extraction reference determination unit 18.

Here, the image extraction reference includes a scene, a person, an object, and the like. For example, in a case where the image extraction reference is an image which is a sea scene and in which person A is present, an image which is a sea scene and in which person A is present is extracted from the second image group.

Figure 3:
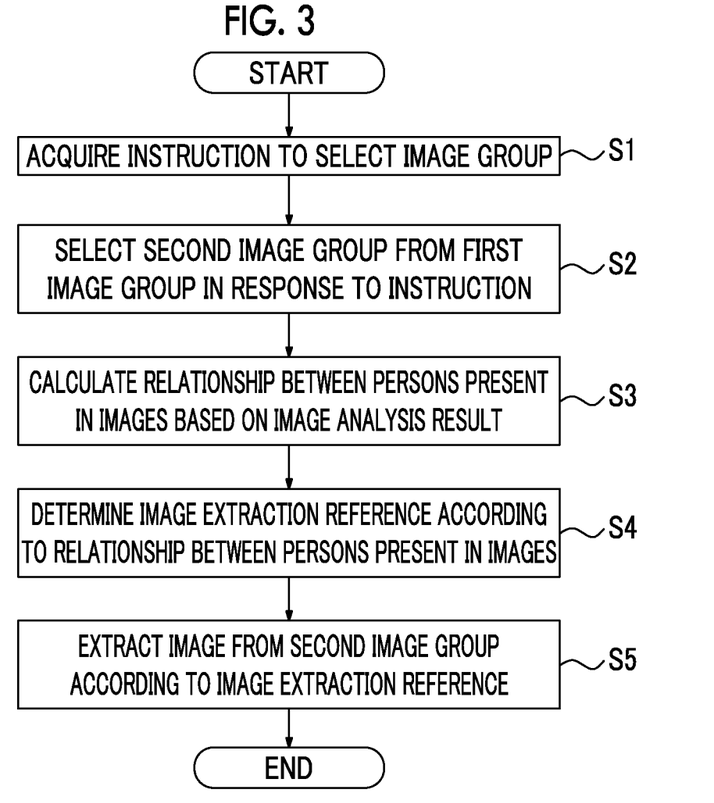
FIG. 3 is a flowchart of an embodiment showing the operation of the image extraction device of the invention.

Next, the operation of the image extraction device 10 will be described with reference to the flowchart shown in FIG. 3.

In the image extraction device 10, an instruction to select a second image group from a first image group input by the user is acquired first by the instruction acquisition unit 12 (step S1). In response to the instruction, the image group selection unit 14 selects a second image group from the first image group (step S2).

Then, the image analysis unit 16 analyzes each image included in the first image group, and calculates the relationship between persons present in the images included in the first image group based on the analysis result of the images included in the first image group. Similarly, the image analysis unit 16 calculates the relationship between persons present in images included in the second image group based on the analysis result of the images included in the second image group (step S3).

In the image analysis unit 16, the image information acquisition section 22 acquires image information regarding the images included in the first image group, and the image feature analysis section 24 analyzes the features of the images included in the first image group based on the image information. Then, based on the image information and the image features, the relationship calculation section 26 calculates the relationship between the persons present in the images included in the first image group, and calculates the relationship between the persons present in the images included in the second image group.

Then, according to the relationship between the persons present in the images included in the first image group and the relationship between the persons present in the images included in the second image group, the extraction reference determination unit 18 determines an image extraction reference when extracting an image from the second image group (step S4).

Finally, the image extraction unit 20 extracts an image from the second image group according to the image extraction reference (step S5).

In the image extraction device 10, an image extraction reference is determined in consideration of not only the relationship between the persons present in the images included in the second image group but also the relationship between the persons present in the images included in the first image group, and an image is extracted from the second image group based on the image extraction reference. Thus, by determining the image extraction reference based on the images included in the first image group of a higher level than the second image group, an image with a high degree of importance for the user can be accurately extracted from the second image group.

Next, the image information acquisition section 22, the image feature analysis section 24, and the relationship calculation section 26 provided in the image analysis unit 16 will be further described.

Figure 4:
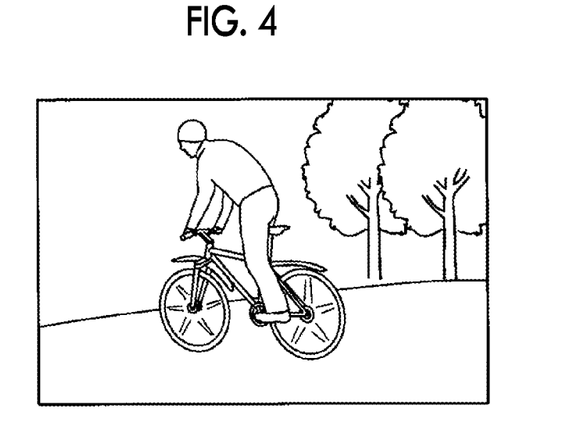
FIG. 4 is a conceptual diagram of an example showing an image for acquiring image information.

Table 1 shows an example of image information obtained from an image shown in FIG. 4 by the image information acquisition section 22.

TABLE 1

| | Image information |
|---|---|
| Imaging date | Monday, Apr. 9, 2015 |
| Scene | Outdoor |
| Imaging location | xxx (GPS information) |
| Subject    Person A | Region in an image |
| | Distance from another subject and    Bicycle: |
| | positional relationship with another    . . . |
| | subject |
|             Bicycle | . . . |

In the case of the image shown in FIG. 4, as shown in Table 1, the image information acquisition section 22 acquires, for example, "imaging date is Monday, Apr. 9, 2015" and "imaging location is xxx (GPS information)" from the Exif information as image information.

In addition, by image analysis, for example, "scene is outdoor", "subjects are a person A and a bicycle", and the like are acquired. For the person A, for example, as a region in an image (in which location and size in the image the person A is present?) or a distance from another subject and the positional relationship, a distance from the bicycle, positional relationship, and the like are acquired as image information. For the bicycle, image information is similarly acquired.

The image information acquisition section 22 acquires the above-described image information from each image included in the first image group.

Subsequently, Table 2 shows an example of image features obtained by analyzing each image included in the first image group based on the image information by the image feature analysis section 24. As shown in Table 2, the image features include image features for the imaging content, imaging date and time, imaging location, and the like of each image.

TABLE 2

| Items | Image features |
|---|---|
| Imaging content | Persons appearing frequently: person A, person B, person C, . . . |
| | Objects appearing frequently: dogs, cats, food, . . . |
| | Scenes appearing frequently: outdoors, indoor, mountain, sea, . . . |
| | . . . |
| Imaging date | Image group of several months: several images captured almost every day |
| | Image group of one year: a large number of images captured once in a few months |
| | Image group of one day: a large number of images captured during several hours |
| | . . . |
| Imaging location | Imaging only in the vicinity of a particular location |
| | Imaging in various locations |
| | . . . |
| . . . | . . . |

As image features of the imaging content, as shown in Table 2, for example, "persons appearing frequently (equal to or greater than a threshold value) in the first image group are person A, person B, person C, . . . ", "objects appearing frequently are dogs, cats, food, . . . ", and "scenes appearing frequently are outdoor, indoor, mountain, sea, . . . " are analyzed by the image feature analysis section 24.

As image features of the imaging date, for example, "first image group is an image group of several months and several images have been captured almost every day (images are captured on a daily basis)", "first image group is an image group of one year and a large number of images have been captured once in a few months (images are captured only in a big event, such as a trip)", and "first image group is an image group of one day and a large number of images have been captured during several hours (images are captured in a particular event, such as a wedding)" are analyzed.

As image features of the imaging location, for example, "imaging has been performed only in the vicinity of a particular location" and "imaging has been performed in various locations" are analyzed. The image feature analysis section 24 analyzes the above-described image features from the image information of each image included in the first image group.

Then, in the relationship calculation section 26, for example, the relationship between persons present in the images included in the first image group is calculated. Based on the relationship, it is possible to determine the degree of importance of each person, such as a main person or an important person.

For example, the relationship calculation section 26 can determine one or more persons appearing frequently (equal to or greater than a threshold value) in the first image group, among the persons present in the images included in the first image group, as main persons based on the relationship between the persons.

In addition, the relationship calculation section 26 can determine a main person based on a combination of the number of appearances in the first image group and the number of times that each person is present in the center position of each image included in the first image group. In this case, the relationship calculation section 26 determines, for example, a person whose number of times present in the center position of each image included in the first image group is equal to or greater than a threshold value, among persons whose number of time of appearing is equal to or greater than a threshold value in the first image group, as a main person.

In addition, the relationship calculation section 26 can determine a main person based on a combination of the number of appearances in the first image group and the number of times that each person is present toward the front direction in the images included in the first image group. In this case, the relationship calculation section 26 determines, for example, a person whose number of times present toward the front direction in the images included in the first image group is equal to or greater than a threshold value, among persons whose number of times of appearance is equal to or greater than a threshold value in the first image group, as a main person.

In addition, the relationship calculation section 26 can determine a main person based on a combination of the number of appearances in the first image group and the number of times that each person is present in the images included in the first image group with a face size is equal to or greater than a threshold value (including the case of zoom imaging). In this case, the relationship calculation section 26 determines, for example, a person whose number of times present in the images included in the first image group with a face size equal to or greater than a threshold is equal to or greater than a threshold value, among persons whose number of times of appearance is equal to or greater than a threshold value in the first image group, as a main person.

In addition, the relationship calculation section 26 can determine a main person based on a combination of the number of appearances in the first image group and at least one of the number of times that each person is present in the center position of each image included in the first image group, the number of times by which each person is present toward the front direction in the images included in the first image group, and the number of times by which each person is present in the images included in the first image group with a face size equal to or greater than a threshold value.

In addition, the relationship calculation section 26 can determine, for example, one or more persons who are present in the images included in the first image group and whose distances from a main person is equal to or less than a threshold value, among persons other than the main person who are present in the images included in the first image group, as important persons based on the relationship between persons.

Figure 5A:
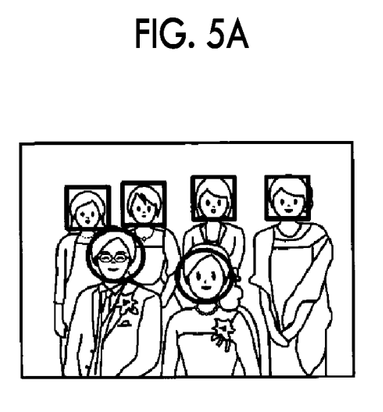
FIG. 5A is a conceptual diagram of an example showing a case where the distance between a bride and groom and friends is equal to or less than a threshold value.
Figure 5B:
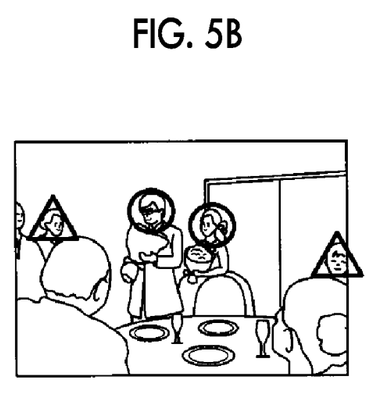
FIG. 5B is a conceptual diagram of an example showing a case where the distance between the bride and groom and friends is greater than the threshold value.

For example, FIGS. 5A and 5B are images captured at a wedding. In the image shown in FIG. 5A, a bride and groom and four friends of the bride and groom are present. In a case where the bride and groom surrounded by a circle are main persons, for example, four friends surrounded by a square, of which distances from the bride and groom are equal to or less than a threshold value, are determined as important persons. In addition, in the image shown in FIG. 5B, there are several persons in addition to the bride and groom. For example, persons surrounded by a triangle, of which distances from the bride and groom surrounded by a circle are greater than a threshold value, are determined as other persons who are neither main persons nor important persons.

In addition, even in a case where a main person is not present in the images included in the first image group, the relationship calculation section 26 can determine the degree of importance of each person other than the main person based on the relationship between persons other than the main person who are present in the images included in the first image group.

Figure 6A:
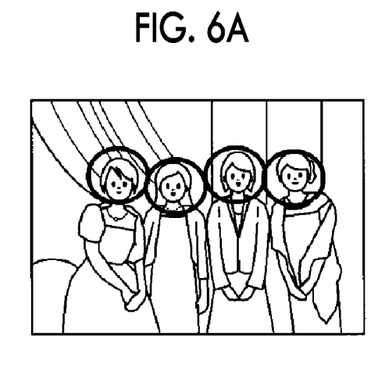
FIG. 6A is a conceptual diagram of an example showing an image in a case where two or more persons other than a main person are present toward the front direction in the center position.

As surrounded by a circle shown in FIG. 6A, in a case where two or more persons other than a main person are present in the center position of each image included in the first image group, the relationship calculation section 26 can determine the two or more persons other than the main person as important persons based on the relationship between persons other than the main person.

Figure 6B:
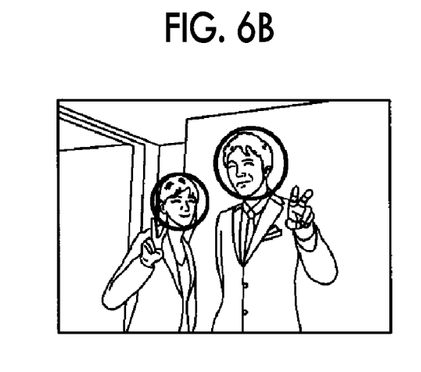
FIG. 6B is a conceptual diagram of an example showing an image in a case where two or more persons other than a main person are present with a face size equal to or greater than a threshold value.

In addition, as surrounded by a circle shown in FIGS. 6A and 6B, in a case where two or more persons other than a main person are present toward the front direction in each image included in the first image group, the relationship calculation section 26 can determine the two or more persons other than the main person as important persons based on the relationship between persons other than the main person.

As surrounded by a circle shown in FIG. 6B, in a case where two or more persons other than a main person are present in each image included in the first image group with a face size equal to or greater than a threshold value, the relationship calculation section 26 can determine the two or more persons other than the main person as important persons based on the relationship between persons other than the main person.

As described above, in a case where a main person and important persons are determined by the relationship calculation section 26, the extraction reference determination unit 18 determines an image extraction reference according to the main person and the important persons, that is, according to the degree of importance of each person.

In addition, the relationship calculation section 26 may calculate the relationship between each person present in the images included in the first image group and each object other than the person based on the analysis result of the images included in the first image group.

In this case, the extraction reference determination unit 18 can determine the image extraction reference according to the relationship between each person and each object present in the images included in the first image group.

In addition, the relationship calculation section 26 can determine the degree of importance of each object for each person, as an important object, based on the relationship between each person and each object.

In this case, the extraction reference determination unit 18 can determine the image extraction reference according to the important object, that is, according to the degree of importance of the object.

For example, as in the image shown in the diagram, in a case where a bicycle (object) is present near person A (person), it can be estimated that person A's hobby is riding a bicycle and a bicycle is important for person A.

In addition to the relationship between persons, for example, the relationship calculation section 26 can use the relationship between a person and an object, the relationship between a person and a scene, the relationship between a person and an imaging date, the relationship between a person and an imaging location, the relationship between an object and an object, and the like based on the images included in the first image group.

In the case of using the relationship between a scene and a person present in each image included in the first image group, the relationship calculation section 26 determines, for example, a scene that has been imaged many times (equal to or greater than a threshold value), among the scenes of the images included in the first image group, as an important scene. Then, a person and an object, which are present in the images included in the first image group and are highly (equal to or greater than a threshold value) related to an important scene, are determined as an important person and an important object.

In this case, the extraction reference determination unit 18 can determine the image extraction reference according to the main person, the important person, and the important object.

For example, in a case where there are many sea images in the first image group, it can be estimated that the sea is an important scene. Therefore, a person and an object which are highly related to an important scene, in the case of this example, a person and an object imaged in the sea scene are important.

In the case of using the relationship between an imaging date and a person present in each image included in the first image group, the relationship calculation section 26 determines, for example, an imaging date on which imaging has been performed many times (equal to or greater than a threshold value), among the imaging dates of the images included in the first image group, as an important imaging date. Then, a person, an object, and a scene, which are present in the images included in the first image group and have a high (equal to or greater than a threshold value) relationship with an important imaging date, are determined as an important person, an important object, and an important scene.

In this case, the extraction reference determination unit 18 can determine the image extraction reference according to the main person, the important person, the important object, and the important scene.

For example, an imaging date on which imaging has been performed many times in the first image group can be estimated to be an important imaging date. Therefore, a person, an object, and a scene having a strong relationship with an important imaging date are important. For example, in an image group of one year, in a case where hundreds of images have been captured in a day on trips in summer and winter, persons, objects, and scenes that are present in the images included in the image group during the trips are important.

As the imaging date, it is possible to use not only the imaging day but also an imaging time range, an imaging month, an imaging season, and the like.

In the case of using the relationship between an imaging location and a person present in each image included in the first image group, the relationship calculation section 26 determines, for example, an imaging location that has been imaged many times (equal to or greater than a threshold value), among the imaging locations of the images included in the first image group, as an important imaging location. Then, a person, an object, and a scene, which are present in the images included in the first image group and have a high (equal to or greater than a threshold value) relationship with an important imaging location, are determined as an important person, an important object, and an important scene.

In this case, the extraction reference determination unit 18 determines the image extraction reference according to the main person, the important person, the important object, and the important scene.

For example, an imaging location that has been imaged many times in the first image group can be estimated to be an important imaging location. Therefore, a person, an object, and a scene having a strong relationship with an important imaging location are important. For example, in the first image group, in a case where hundreds of images have been captured in Paris, persons, objects, and scenes that are present in the images included in the image group, which have been captured in Paris, are important.

In a case where a scene, an imaging date, an imaging location, and the like having a large number of times of imaging are not present in the first image group, the relationship calculation section 26 does not need to consider the scenes, imaging dates, imaging locations, and the like of the images included in the first image group.

Table 3 is an example of a case where the important elements in the first image group for a person, a scene, an imaging date, an imaging location, . . . are person A, sea, May 10, xx, . . . . In this case, for example, for a person, an important person is person A. Since person A is present in an image A, the degree of importance of the image A is high. Based on the degree of importance of a person, the degree of importance of each image included in the first image group can be determined. For example, it can be determined that the degree of importance of images B and C is medium and the degree of importance of an image D is low. This is the same for the scene, the imaging date, the imaging location, and the like.

TABLE 3

|  | Person | Scene | Imaging date | Imaging location | . . . |
|---|---|---|---|---|---|
| Important elements in an image group | Person A | Sea | May 10 | xx |  |
| Image A | Large |  |  |  |  |
| Image B | Medium |  |  |  |  |
| Image C | Medium |  |  |  |  |
| Image D | Small |  |  |  |  |
| . . . | . . . |  |  |  |  |

Next, a case where a second image group is selected from a first image group hierarchically classified according to imaging dates will be described as an example.

Figure 7A:
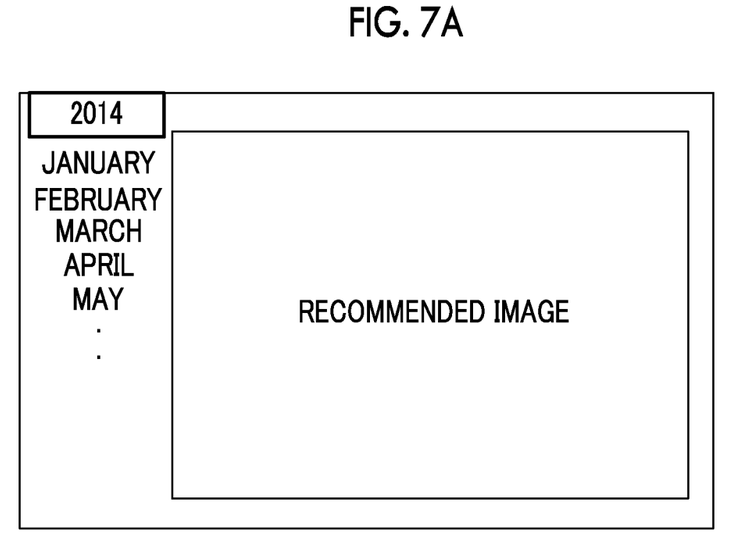
FIG. 7A is a conceptual diagram of an example showing a state in which an image group imaged in 2014 has been selected as a first image group.

As shown in FIG. 7A, in the present embodiment, it is assumed that the first image group is an image group of 2014 and there is no image group of a higher level than the image group of 2014. In this case, based on the relationship between persons present in images included in the image group of 2014, the relationship between the persons present in the images included in the image group of 2014 is determined. In the present embodiment, it is assumed that family members (children and parents) are determined to be important persons from the relationship between the persons present in the images included in the image group of 2014.

That is, family images are preferentially extracted from the image group of 2014, and are displayed as recommended images, for example.

Figure 7B:
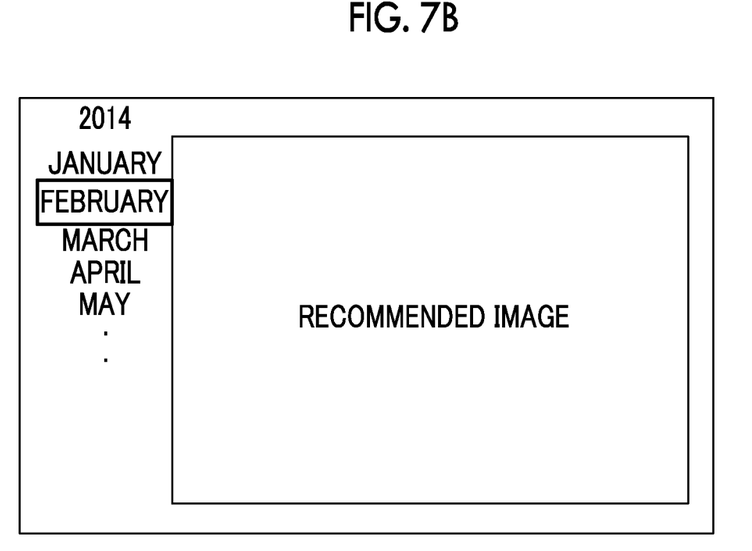
FIG. 7B is a conceptual diagram of an example showing a state in which an image group imaged in February, 2014 has been selected as a second image group.

Then, as shown in FIG. 7B, it is assumed that an image group of February, 2014 has been selected from the image group of 2014, as a second image group, by the user. In this case, the relationship between the persons present in the images included in the image group of February, 2014 is determined. In the present embodiment, it is assumed that, since most of the images are wedding images on Feb. 14, 2014, the bride and groom are determined to be important persons from the relationship between the persons present in the images included in the image group of February, 2014.

That is, as shown in Table 4, it can be seen that the degree of importance of the bride and groom is high in a case where the image group of only February, 2014 is taken into consideration but the degree of importance of the family is high in a case where the image group of the entire 2014 is taken into consideration.

TABLE 4

| | Imaging date | Important persons |
|---|---|---|
| 2014 | All | family |
| | January | |
| | February | Bride and groom |
| | March | |
| | ... | |

In a known image extraction device, since the image group of only February, 2014 is taken into consideration, images including the bride and groom are extracted from the image group of February, 2014. For this reason, even if the first image group is images owned by the family members of the bride and groom and images including the family members of the bride and groom are present in the image group of February, 2014, the images of the family members cannot be extracted from the image group of February, 2014 since the degree of importance of the family members is low in the image group of February, 2014.

That is, in the known image extraction device, images of the bride and groom are preferentially extracted from the image group of February, 2014, and are displayed as recommended images, for example.

In contrast, in the image extraction device 10 of the present embodiment, the image extraction reference is determined taking into consideration not only the image group of February, 2014 but also the image group of the entire 2014 of a higher level than the image group of February, 2014. Therefore, based on the image extraction reference, in addition to images in which the bride and groom with a high degree of importance are present in the image group of February, 2014, images in which family members of the bride and groom with a high degree of importance are present in the image group of 2014 of a higher level than the image group of February, 2014 can be extracted from the image group of February, 2014.

That is, in the image extraction device 10 of the present embodiment, images of the bride and groom and their family members are preferentially extracted from the image group of February, 2014, and are displayed as recommended images, for example.

In this case, it is desirable to determine the image extraction reference by giving priority to the relationship between persons (the degree of importance of a person) present in the images included in the image group of February, 2014, which is a second image group of the lower level, over the relationship between persons (the degree of importance of a person) present in the images included in the image group of 2014 that is a first image group of the higher level. In this manner, it is possible to extract a number of images of the bride and groom preferentially from the image group of February, 2014 and to extract a small number of family images from the image group of February, 2014.

Not only can the user select February, 2014 from the image group of 2014, but also the user can select simultaneously a plurality of months, for example, February, March, and June, 2014.

In addition, not only can the user select a second image group from the first image group based on the imaging date, but also the user can select a second image group from the first image group based on the imaging location or a folder.

In a case where a second image group is selected from the first image group based on the imaging location, an instruction to select a second image group captured in an imaging location within a predetermined range input by the user from the first image group hierarchically classified according to imaging locations is acquired by the instruction acquisition unit 12. Then, in response to the user instruction acquired by the instruction acquisition unit 12, the image group selection unit 14 selects an image group of the imaging location of the lower level than the first image group, as a second image group, from the first image group.

As shown in Table 5, the first image group is an image group captured in the entire Japan, and is hierarchically classified according to imaging locations, such as Kyoto (parents' home), Roppongi (workplace), and Shinyurigaoka (home). In a case where the second image group is an image group captured in Kyoto (parents' home), the degree of importance of grandparents and relatives is high and the degree of importance of family members (children and parents) is low in a case where the image group of only Kyoto is taken into consideration. However, in a case where the image group of the entire Japan is taken into consideration, it is assumed that the degree of importance of family members is high.

TABLE 5

| | Imaging location | Important persons |
|---|---|---|
| Japan | All | Family members |
| | Kyoto (parents' home) | grandparents and relatives |
| | Roppongi (workplace) | coworkers |
| | Shinyurigaoka (home) | Family members |
| | ... | |

Similarly, in a known image extraction device, since the image group of only Kyoto (parents' home) is taken into consideration, images including grandparents and relatives are extracted from the image group of Kyoto (parents' home), and family images are not extracted.

In contrast, in the image extraction device 10 of the present embodiment, the image extraction reference is determined taking into consideration not only the image group of only Kyoto (parents' home) but also the image group of the entire Japan of a higher level than the image group of Kyoto. Therefore, based on the image extraction reference, in addition to images in which grandparents and relatives with a high degree of importance are present in the image group of Kyoto (parents' home), images in which family members with a high degree of importance are present in the image group of the entire Japan of a higher level than the image group of Kyoto can be extracted from the image group of Kyoto (parents' home).

In a case where a second image group is selected from the first image group based on a folder, an instruction to select an image group, which is included in a folder within a predetermined range input by the user, from the first image group classified according to folders is acquired by the instruction acquisition unit 12. Then, in response to the user instruction acquired by the instruction acquisition unit 12, the image group selection unit 14 selects an image group of a folder of the lower level than the first image group, as a second image group, from the first image group.

As shown in Table 6, the first image group is an image group of the entire root folder, and is hierarchically classified according to a folder of each event, such as a wedding, an athletic meet, and a birthday. In a case where the second image group is an image group of a wedding folder, the degree of importance of the bride and groom is high and the degree of importance of family members (children and parents) is low in a case where the image group of only the wedding folder is taken into consideration. However, in a case where the image group of the entire root folder is taken into consideration, it is assumed that the degree of importance of family members is high.

TABLE 6

|  | Folder | Important persons |
|---|---|---|
| Root folder | All | Family members |
|  | Wedding | Bride and groom |
|  | Athletic meet |  |
|  | Birthday |  |
|  | . . . |  |

Similarly, in a known image extraction device, since the image group of only the wedding folder is taken into consideration, images including the bride and groom are extracted from the image group of the wedding folder, and family images are not extracted.

In contrast, in the image extraction device 10 of the present embodiment, the image extraction reference is determined taking into consideration not only the image group of only the wedding folder but also the image group of the entire root folder of a higher level than the image group of the wedding folder. Therefore, based on the image extraction reference, in addition to images in which the bride and groom with a high degree of importance are present in the image group of the wedding folder, images in which family members with a high degree of importance are present in the image group of the entire root folder of a higher level than the image group of the wedding folder can be extracted from the image group of the wedding folder.

The image extraction device of the invention can be used in the case of selecting a second image group to be used in a composite image from the first image group when creating a composite image, such as an electronic album, a photo book, a collage print, and a calendar with an image.

For example, in the case of creating a collage print from an image group of one month, it is possible to determine an image extraction reference in consideration of the image group of one month and an image group of the entire one year of a higher level than the image group of one month and to extract an image group to be used in a collage print from the image group of one month based on the image extraction reference. In addition, in the case of creating a photo book of 24 pages for 12 months (two-page spread per month) from an image group of one year, it is possible to determine an image extraction reference in consideration of an image group of each month and an image group of the entire one year and to extract an image group to be used in a two-page spread of each month from the image group of each month based on the image extraction reference.

The image extraction device of the invention can be applied to a video image without being limited to a still image.

As the first image group, for example, an image group that the user uploads from a server or the like in order to create a composite image, such as an electronic album, a photo book, a collage print, and a calendar with an image, can be exemplified.

Alternatively, in response to the instruction of the user acquired by the instruction acquisition unit 12, a first image group may be selected from an image group already uploaded by the user. Thus, the user can select a first image group by himself or herself.

In addition, in a case where a second image group is selected, a first image group including the second image group may be automatically selected. For example, a case is considered in which a user attends the wedding of a coworker of the company and images of the wedding are uploaded on the wedding day. In this case, an image group obtained by combining the image group (second image group) uploaded on the wedding day and an arbitrary image group already uploaded before the wedding day may be automatically selected as a first image group. In this manner, the user can automatically determine the first image group without being aware of the first image group.

In addition, an image group determination unit may be provided to determine an image group to be analyzed by the image analysis unit 16 from the first image group. For example, in a case where the first image group is an image group of 2014 and an image group of May 6, 2014 is selected as a second image group, for example, an image group of May, 2014 or an image group of 2015 can be determined as an image group to be analyzed by the image analysis unit 16 from the image group of 2014 that is the first image group. This is the same for a case where the first image group is classified according to imaging locations and folders.

It is not essential to determine the image extraction reference based on the relationship between persons present in the images included in the second image group and extract an image from the second image group based on the image extraction reference. The image extraction reference may be determined based on only the relationship between persons present in the images included in the first image group, and an image may be extracted from the second image group based on the image extraction reference.

In addition, without being limited to the relationship and the degree of importance, the extraction reference determination unit 18 may determine the image extraction reference when extracting an image from the second image group based on the images included in the first image group, that is, using various kinds of information obtained from the images included in the first image group.

In the device of the invention, each component of the device may be formed using dedicated hardware, or each component may be formed using a programmed computer.

The method of the invention can be realized, for example, by a program causing a computer to execute each step of the method. In addition, it is also possible to provide a computer-readable recording medium in that the program is recorded.

While the invention has been described in detail, the invention is not limited to the above-described embodiment, and various improvements and modifications may be made without departing from the scope and spirit of the invention.

What is claimed is:
1. An image extraction device, comprising:
an instruction acquisition unit that acquires an instruction input by a user;
an image group selection unit that selects a second image group, which has a smaller number of images than a first image group, from the first image group in response to the instruction;

an extraction reference determination unit that determines an image extraction reference when extracting an image from the second image group based on images included in the first image group;

an image extraction unit that extracts one or more images, the number of which is smaller than the number of images in the second image group, from the second image group according to the image extraction reference; and an image analysis unit that analyzes images included in the first image group and calculates a relationship between persons present in the images included in the first image group based on the analysis result;

the image analysis unit comprising:
  an image information acquisition section that acquires image information regarding images included in the first image group;
  an image feature analysis section that analyzes features of the images included in the first image group based on the image information; and
  a relationship calculation section that calculates a relationship between persons present in the images included in the first image group based on the image information and the image feature, wherein the extraction reference determination unit determines the image extraction reference according to the relationship between persons, the relationship calculation section determines a degree of importance of each person from the relationship between persons, the extraction reference determination unit determines the image extraction reference according to the degree of importance of each person, the relationship calculation section determines one or more persons whose number of times of appearance is equal to or greater than a threshold value in the first image group, among persons present in the images included in the first image group, as main persons, and determines one or more persons who are present in the images included in the first image group and whose distances from the main persons are equal to or less than a threshold value, among persons other than the main persons who are present in the images included in the first image group, as important persons, and the extraction reference determination unit determines the image extraction reference according to the main persons and the important persons.

2. The image extraction device according to claim 1, wherein the image analysis unit further calculates a relationship between persons present in images included in the second image group based on an analysis result of the images included in the second image group, and the extraction reference determination unit further determines the image extraction reference according to the relationship between persons present in the images included in the second image group.

3. The image extraction device according to claim 2, wherein the extraction reference determination unit determines the image extraction reference by giving priority to the relationship between persons present in the images included in the second image group over the relationship between persons present in the images included in the first image group.

4. The image extraction device according to claim 1, wherein the relationship calculation section determines one or more persons whose number of times present in a center position of each image included in the first image group is equal to or greater than a threshold value, among persons whose number of times of appearance in the first image group is equal to or greater than a threshold value, as the main persons.

5. The image extraction device according to claim 1, wherein the relationship calculation section determines one or more persons whose number of times present toward a front direction in each image included in the first image group is equal to or greater than a threshold value, among persons whose number of times of appearance in the first image group is equal to or greater than a threshold value, as the main persons.

6. The image extraction device according to claim 1, wherein the relationship calculation section determines one or more persons whose number of times present with a face size equal to or greater than a threshold value in each image included in the first image group is equal to or greater than a threshold value, among persons whose number of times of appearance in the first image group is equal to or greater than a threshold value, as the main persons.

7. The image extraction device according claim 1, wherein the relationship calculation section further determines two or more persons other than the main persons, who are present in a center position of each image included in the first image group, as important persons.

8. The image extraction device according to claim 1, wherein the relationship calculation section further determines two or more persons other than the main persons, who are present toward a front direction in each image included in the first image group, as important persons.

9. The image extraction device according to claim 1, wherein the relationship calculation section further determines two or more persons other than the main persons, who are present with a face size equal to or greater than a threshold value in each image included in the first image group, as important persons.

10. The image extraction device according to claim 1, wherein the relationship calculation section further calculates a relationship between a person present in each image included in the first image group and an object other than the person, and the extraction reference determination unit further determines the image extraction reference according to the relationship between the person and the object present in each image included in the first image group.

11. The image extraction device according to claim 10, wherein the relationship calculation section determines a degree of importance of the object from the relationship between the person and the object, and the extraction reference determination unit determines the image extraction reference according to the degree of importance of the object.

12. The image extraction device according to claim 11, wherein the relationship calculation section determines a scene that has been imaged a number of times equal to or greater than a threshold value, among scenes of images included in the first image group, as an important scene, and determines a person and an object, which are present in the images included in the first image group and whose relationship with the important scene is equal to or greater than a threshold value, as an important person and an important object, and the extraction reference determination unit determines the image extraction reference according to the main person, the important person, and the important object.

13. The image extraction device according to claim 11, wherein the relationship calculation section determines an imaging date on which imaging has been performed a number of times equal to or greater than a threshold value, among imaging dates of images included in the first image group, as an important imaging date, and determines a person, an object, and a scene which are present in the images included in the first image group and whose relationship with the important imaging date is equal to or greater than a threshold value, as an important person, an important object, and an important scene, and the extraction reference determination unit determines the image extraction reference according to the main person, the important person, the important object, and the important scene.

14. The image extraction device according to claim 13, wherein the imaging date is an imaging time range, an imaging date, an imaging month, or an imaging season.

15. The image extraction device according to claim 11, wherein the relationship calculation section determines an imaging location that has been imaged a number of times equal to or greater than a threshold value, among imaging locations of images included in the first image group, as an important imaging location, and determines a person, an object, and a scene which are present in the images included in the first image group and whose relationship with the important imaging location is equal to or greater than a threshold value, as an important person, an important object, and an important scene, and the extraction reference determination unit determines the image extraction reference according to the main person, the important person, the important object, and the important scene.

16. The image extraction device according to claim 1, further comprising:
an image group determination unit that determines an image group to be analyzed by the image analysis unit from the first image group.

17. The image extraction device according to claim 1, wherein the instruction acquisition unit acquires an instruction to select the second image group imaged on an imaging date within a predetermined range input by the user from the first image group classified according to imaging dates.

18. The image extraction device according to claim 1, wherein the instruction acquisition unit acquires an instruction to select the second image group imaged in an imaging location within a predetermined range input by the user from the first image group classified according to imaging locations.

19. The image extraction device according to claim 1, wherein the instruction acquisition unit acquires an instruction to select the second image group, which is included in a folder within a predetermined range input by the user, from the first image group classified according to folders.

20. An image extraction method, comprising:
a step in which an instruction acquisition unit acquires an instruction input by a user;
a step in which an image group selection unit selects a second image group, which has a smaller number of images than a first image group, from the first image group in response to the instruction;
a step in which an extraction reference determination unit determines an image extraction reference when extracting an image from the second image group based on images included in the first image group;
a step in which an image extraction unit extracts one or more images, the number of which is smaller than the number of images in the second image group, from the second image group according to the image extraction reference; and
a step in which an image analysis unit analyzes images included in the first image group and calculates a relationship between persons present in the images included in the first image group based on the analysis result;
the step in which the image analysis unit calculates the relationship between persons including:
a step in which an image information acquisition section acquires image information regarding images included in the first image group;
a step in which an image feature analysis section analyzes features of the images included in the first image group based on the image information; and
a step in which a relationship calculation section calculates a relationship between persons present in the images included in the first image group based on the image information and the image features, wherein
the extraction reference determination unit determines the image extraction reference according to the relationship between persons,
the relationship calculation section determines a degree of importance of each person from the relationship between persons,
the extraction reference determination unit determines the image extraction reference according to the degree of importance of each person,
the relationship calculation section determines one or more persons whose number of times of appearance is equal to or greater than a threshold value in the first image group, among persons present in the images included in the first image group, as main persons, and determines one or more persons who are present in the images included in the first image group and whose distances from the main persons are equal to or less than a threshold value, among persons other than the main persons who are present in the images included in the first image group, as important persons, and
the extraction reference determination unit determines the image extraction reference according to the main persons and the important persons.

21. The image extraction method according to claim 20, wherein the relationship calculation section further calculates a relationship between a person present in each image included in the first image group and an object other than the person, and
the extraction reference determination unit further determines the image extraction reference according to the relationship between a person and an object present in each image included in the first image group.

22. A non-transitory computer-readable recording medium on which a program causing a computer to execute each step of the image extraction method according to claim 20 is recorded.

23. An image extraction device, comprising:
a processor configured to:
  acquire an instruction input by a user,
  select a second image group, which has a smaller number of images than a first image group, from the first image group in response to the instruction,
  determine an image extraction reference when extracting an image from the second image group based on images included in the first image group,
  extract one or more images, the number of which is smaller than the number of images in the second image group, from the second image group according to the image extraction reference,
analyze images included in the first image group and calculates a relationship between persons present in the images included in the first image group based on the analysis result,
wherein the processor:
  determines the image extraction reference according to the relationship between persons,
  acquires image information regarding images included in the first image group;
  analyzes features of the images included in the first image group based on the image information, and
  calculates a relationship between persons present in the images included in the first image group based on the image information and the image features,
wherein the processor further determines a degree of importance of each person from the relationship between persons, and determines the image extraction reference according to the degree of importance of each person, and
wherein the processor even further determines one or more persons whose number of times of appearance is equal to or greater than a threshold value in the first image group, among persons present in the images included in the first image group, as main persons, and determines one or more persons who are present in the images included in the first image group and whose distances from the main persons are equal to or less than a threshold value, among persons other than the main persons who are present in the images included in the first image group, as important persons, and the processor determines the image extraction reference according to the main persons and the important persons.

* * * * *